United States Patent [19]

Vollmer et al.

[11] 4,176,199
[45] Nov. 27, 1979

[54] EXTRACTION OF PROTEIN FROM EDIBLE BEEF BONES AND PRODUCT

[75] Inventors: Arthur N. Vollmer; George E. Rainey, both of Canton, Ohio

[73] Assignee: Sugardale Foods, Incorporated, Canton, Ohio

[21] Appl. No.: 906,029

[22] Filed: May 15, 1978

[51] Int. Cl.$^2$ .......................... A23J 1/10; A23L 1/313
[52] U.S. Cl. ......................................... 426/59; 426/32; 426/657; 426/417
[58] Field of Search .................. 426/7, 32, 55, 56, 59, 426/417, 657

[56] References Cited

U.S. PATENT DOCUMENTS

| | | | |
|---|---|---|---|
| 1,922,484 | 8/1933 | Mapson et al. | 426/59 X |
| 3,098,014 | 7/1963 | Denton et al. | 426/56 |
| 3,112,203 | 11/1963 | Watt | 426/59 |
| 3,276,880 | 10/1966 | Torr | 426/59 |
| 3,634,191 | 1/1972 | Laboureur et al. | 426/32 X |
| 3,692,538 | 9/1972 | Moss et al. | 426/59 |
| 3,906,118 | 9/1975 | McFarland | 426/59 X |
| 3,944,655 | 3/1976 | Levin et al. | 426/59 X |
| 4,018,650 | 4/1977 | Busta et al. | 426/55 X |

*Primary Examiner*—Robert A. Yoncoskie
*Attorney, Agent, or Firm*—Frease & Bishop

[57] ABSTRACT

Protein is extracted from edible beef bones by crushing the bones to a predetermined size, then cooking the bones in approximately equal parts of water by weight with a papain based proteolytic enzyme added in a predetermined amount. Cooking is carried out for a total period of about 4–6 hours at stepped-up temperatures reaching up to but not in excess of about 195° F. to avoid thermal shock to components. The cooked mixture is then filtered and screened to separate liquids from solids. The liquids then are centrifuged to separate the fats from the thus produced end product, a 4–7% solution of protein by weight. Thus three edible and salable products are produced without waste from the raw bone, i.e., gelatin bone, edible tallow or grease, and protein broth. The cooked material is held at about 150° F. during filtering and centrifuging.

8 Claims, No Drawings

EXTRACTION OF PROTEIN FROM EDIBLE BEEF BONES AND PRODUCT

BACKGROUND OF THE INVENTION

1. Field of the Invention

The invention relates to an economically feasible procedure for extracting major amounts of protein from beef bones to produce an end product solution containing desirable 4–7% concentration of protein by weight, which end product has uses among others as a protein enrichment addition material for other food products.

The economic feasibility of the protein extraction process of the invention depends upon the combined use of crushed, edible beef bone as a raw material to be cooked, the addition of a predetermined amount of enzymes to water in which the crushed bone is cooked in a controlled ratio of bone to water by weight, and to the control of time and temperature conditions of cooking the crushed bone in the solution of water and enzymes.

The other facet of the economic feasibility of the procedure of the invention for extracting protein from raw edible beef bones is that fats and bone separated from the protein broth end product during treatment are edible and salable products. In this manner the raw edible beef bone treated in accordance with the invention produces without waste, gelatin bone, edible tallow or grease, and protein broth all three of which are edible or salable products.

2. Description of the Prior Art

Beef bones are known to contain protein. However, insofar as we are aware, no procedure for simply and economically extracting protein from beef bone has been known which results in the production without waste of three edible and salable products.

Various materials of animals, fish or fowl origin have been treated in the prior art to produce cattle feed, fertilizer, meaty-flavored broth, etc. These prior procedures utilize urea, special enzymes, starch, fat solvents, acid treatments, and two-stage treatments among others. Examples of such procedures are contained in U.S. Pat. Nos. 2,717,835, 3,674,657, 3,692,538, 3,944,655 and 4,018,650.

Other procedures treat bones to provide gelatin bone using soluble salts and special enzymes without extracting protein as an end product, as in U.S. Pat. No. 3,634,191.

The procedure and Examples described in the Moss U.S. Pat. No. 3,692,538 treats beef bones by the steps of heating beef bones in water for an extended time period at from 170° F. to 280° F., then separating the released fat from the aqueous mixture, then treating the aqueous mixture with enzymes, and then treating the aqueous solution of protein hydrolyzates with acid to adjust the pH value of the solution.

This procedure fails to recognize the fact that the initial heating for fat separation at from 175° F. to 280° F. results in producing peptones and peptides which impart an offalish and bitter taste to the protein solution, which in turn requires the subsequent acid treatment to eliminate such undesirable taste.

Further, the high temperature of up to 280° F. for fat separation may thermally shock the bone and protein being cooked, which may prevent the bone from satisfying specifications for gelatin bone and thus prevent its salability as gelatin bone.

Further, the complicated Moss procedure, many steps, time and temperature of heating, etc. very substantially increase the cost of treatment, including high energy consumption and cost of chemical additives, such that the resulting protein solution may have a higher cost than is economically feasible where it is desired to use the protein end product as an addition to enrich other food products such as sausage products.

We are not aware of any prior simple means or procedures for economically extracting protein from beef bones to provide a simple edible and salable protein solution end product having a desirable 4–7% concentration of protein by weight, and which also results without any waste from the starting raw bones material in producing gelatin bone and edible and salable tallow or grease.

SUMMARY OF THE INVENTION

Objects of the invention include providing a process by which protein may be extracted economically from edible beef bones; in which an aqueous protein solution having a desirable concentration of about 4–7% by weight results as an end product of the beef bone treatment, along with producing a by-product of salable edible grease, as well as another by-product of salable processed gelatin bone; in which edible bones are mechanically crushed or ground to produce bone pieces having a maximum dimension of not more than $\frac{5}{8}''$, which exposes bone marrow and increases the ratio of surface to weight of the bone fragments thereby providing maximum processing efficiency; in which the bone fragments are cooked in water to which predetermined amounts of papain based proteolytic enzymes are added, the enzymes functioning during a controlled cooking cycle in which the temperature is not in excess of about 195° F. to prevent production of peptones and peptides, not only to hydrolyze and solubilize the protein, but also to separate fats from the bone; in which the amount of enzyme addition for the cooking cycle depends on the type of enzyme used; in which the cooking cycle is carried out under predetermined conditions of concentration of crushed bone to water by weight, of time of heating in steps or stages, and of temperature control during the steps or stages of heating; in which the cooked bone and solution after cooking, and while under conditions of controlled temperature, are filtered and screened to separate the liquids from solids, and then the liquids are centrifuged to separate fat from the other liquids, which said other liquids comprise a liquid solution of protein as an end product that has a desirable protein concentration of about 4–7% by weight; in which the cooked bone separated by filtering and screening is in condition for use as salable gelatin bone; in which the separated fat or grease may be used as edible grease; in which the resulting protein containing end product solution may be used for protein enrichment of prepared food products; and in which the stated objectives may be achieved in a simple, effective and economically feasible manner with low energy consumption and fewer chemical additives, eliminating indicated problems existing inconnection with prior art procedures, and solving problems and satisfying needs existing in the field of protein-containing food production.

These and other objectives and advantages may be obtained by the new procedure for extracting desirable amounts of protein from beef bones which generally include the steps of mechanically grinding or crushing beef bones to a predetermined size range of bone fragments; mixing the crushed bone fragments with approximately equal parts of water by weight and agitating the mixture in an externally heated or steam jacketed kettle; adding papain based proteolytic enzymes to the contents of the kettle in amounts ranging from 1/10th of 1% to 3½% by weight of the bone in the kettle depending on the type of enzyme used; heating the kettle contents while agitating the same for a total period of about 4 to 6 hours at controlled rates in increasing temperature stages up to but not in excess of 195° F.; then ceasing the heating; then filtering and screening the kettle contents while maintaining the contents at a temperature of about 135° F. to 190° F. to separate the liquids from the solid bone fragments; and then centrifuging the liquids to separate the fats and to produce an end product solution which contains 5% to 7% protein by weight.

DETAILED DESCRIPTION

As an example of a detailed procedure for practicing this invention, edible bones which are a by-product of beef fabricating or boning, which bones have varying amounts of skeletal tissue thereon, may be taken from the boning department of a packing house as the raw material for extracting protein contained therein.

The bones are reduced in size by mechanical crushing or grinding to pieces or fragments having a maximum dimension of not more than ⅝". The reduction to bone fragments may be carried out in any desired type of crushing or grinding equipment such as a Weiler Bone Cutter.

The reduction of bone to fragments is performed for several reasons. First, it increases the ratio of surface to weight of the bone fragments as compared with the initial bone. Thus, maximum processing efficiency results because the exposed bone surfaces of the bone fragments present greater availability for hydrolyzing and solubilizing the protein content of the bone. Second, the crushing of the bone to fragments exposes bone marrow for extraction of protein and fat therein.

The maximum bone fragments dimension of about ⅝" is desirable since this is a preferred maximum dimension of bone fragments used as gelatin bone, as specified by gelatin bone purchasers.

The bone fragments then are placed with approximately equal parts of water by weight in a heating or cooking container such as a steam jacketed kettle. Live steam must not be injected into the kettle contents since this may subject the bone and protein to undesirable thermal shock.

Papain based proteolytic enzymes are added to the contents of the kettle. One type of such enzyme (Tona-300, a product of Baxter Laboratories) may be added in the proportion of about 3½% by weight of the bone in the kettle. Another type of such enzyme that is more concentrated (Papain 90L, a product of Baxter Laboratories) may be used in the proportion of 1/10th of 1% by weight of the bone in the kettle.

The contents of the kettle is heated preferably by a step heating procedure at controlled rates to maximize the digestion of the bone. One example (Example A) of a heating cycle to cook the bone fragments in the kettle may comprise raising the temperature of the kettle contents from 55° F. to 135° F. in about 20 minutes; then continuing the heating while maintaining the temperature at approximately 135° F. for one hour. Then heating for one hour at 145° F., followed by heating for one hour at 155° F. Then the cooking temperature is increased in one-half hour to approximately 175° F. Finally the cooking temperature is raised from 175° F. to but not exceeding 195° F. and the 195° F. temperature is maintained for a time sufficient to inactivate the enzyme, after which heating is stopped.

Another example (Example B) of the step heating of the contents of the kettle to cook the bone fragments may involve raising the temperature of the kettle contents from 55° F. to 125° F. in approximately ten to fifteen minutes. The 125° F. temperature is maintained for one hour and then increased to 135° F. and maintained at 135° F. for one hour, followed by increasing the temperature to 145° F. and maintaining at the 145° F. temperature for one hour. Finally, the cooking temperature is increased from 145° F. to 195° F. in approximately five to ten minutes and maintained at, but not exceeding, 195° F. for about 45 minutes which is a time/temperature control sufficient to inactivate the enzymes.

The cooking may be carried out in either an open or a covered kettle but live steam is not injected into the solution for heating. When covered, the speed of heating is increased and loss of water is reduced. During cooking in either of the Example A or B heating cycles, the kettle contents is agitated by any suitable means such as by stirring.

The next step in the procedure after heating has been stopped at 195° F. is to filter and screen, in any usual filter or screen means, such as a perforated plate filter, the contents of the kettle to completely separate solids (bone) from liquids. Filtering and screening is carried out while the liquid solution is maintained at a temperature of 135° F. to 150° F. The solids comprise cooked bone fragments which are in condition to be used as gelatin bone subject to screening preparation of the bone fragments to desired size range. The fines passing through the perforated stainless plate screen also are a salable product.

Gelatin bone ordinarily should be in fragments or pieces having a maximum dimension not greater than ⅝" and a minimum dimension not less than 3/16". Other specifications for gelatin bone ordinarily require the bone fragments to have a moisture content not exceeding 10% and a fat content not exceeding 2%. In addition, cooking of the bone which is to be used as gelatin bone should not be at a temperature exceeding 212° F. to 240° F.

The treatment described provides cooked bone fragments satisfying the foregoing specifications for gelatin bone, and thus the screened or filtered bone fragments provide a valuable gelatin bone by-product which may be sold as gelatin bone.

The next stage in the procedure is to centrifuge the liquids separated by the filtering and screening stage while continuing to maintain the temperature thereof at 135° F. to 150° F. The centrifuging separates fat from the solution. The separated fat may be processed further in any usual manner as edible fat or grease. The grease separated during centrifuging and processed in the usual manner provides a valuable edible or inedible by-product.

Any desired centrifuge equipment may be used, such as a Sharples Co. unit. Alternately the fat may be separated from the protein solution in a settling tank from which the solution may be drained or the fat or grease skimmed.

The resulting liquids or solution after fats have been separated therefrom is a protein containing liquid end product having a desirable concentration of protein which may average from 4–7% by weight, the remainder of the solution being essentially water.

A protein solution having a protein concentration of 3% or more provides a highly profitable source of protein. Accordingly, the protein solution end product of the procedure described averaging 4–7% protein is a very valuable end product and may be pumped to a holding vessel from which it may be added to sausage batter or formulation which is further processed to form bologna, weiners, salami or the like. The protein containing end product solution alternately may be pumped to a storage tank for future use or sale.

The enrichment of sausage with the protein containing end product is highly desirable from the standpoint of improving the taste of the protein enriched product. Further, the desirable concentration of a 4–7% protein solution provides a very desirable source of protein for enrichment of foods.

COMPARATIVE TESTS

Certain new results flowing from the discoveries of the new concepts for the treatment of bones to extract protein therefrom are shown by comparative procedures and tests carried out as described below.

Test No. 1

This test was made only to analyze the bone marrow for the average composition thereof, with the following results:

| | |
|---|---|
| Protein | 2.6% |
| Fat | 79.5% |
| Moisture | 17.9% |
| Total | 100.0% |

Test No. 2

This test was carried out by cooking crushed bone in water in percentages shown in the table below labeled "START" for six hours with the temperature fluctuating between 160° F. to 180° F. while attempting to hold the temperature at about 170° F. The proportions of bone to liquid solution at the termination of cooking are shown below in the table labeled "FINISH".

| START | 190# | crushed bones | 52.6% | |
|---|---|---|---|---|
| | 171# | water | 47.4% | |
| | 361# | | 100.0% | |
| FINISH | 164# | bones | 13.68% | cook shrink |
| | 194# | solution | 13.45% | cook gain |
| | 358# | | 00.83% | cook loss |

A sample taken of the solution after cooking with the solution well mixed as analyzed indicated 0.9% protein. A second sample was taken after the cooked solution had settled for fifteen minutes also indicated 0.9% protein.

The bones apparently were not cooked completely free of connective tissue and muscle. Test No. 2 indicates that despite the protein which may have originated from bone marrow, only a minor portion of protein was extracted from the bone by processing even with a 52.6%–47.4% ratio of bone to water at the start of cooking.

Test No. 3

The START and FINISH compositions of the kettle contents are shown below, and the protein and fat compositions of samples taken at various stages of the cooking cycle also are indicated.

| START | 135# | crushed bones | 53.6% | |
|---|---|---|---|---|
| | 113# | water | 44.8% | |
| | 4# | salt | 1.6% | (salt to water 03.5%) |
| | 252# | | 100.0% | |
| FINISH | 122# | bones | 09.6% | cook shrink |
| | 126# | solution | 11.5% | cook gain |
| | 248# | | 01.6% | cook loss |
| Sample #1 | after 1 hr cook at 60° to 170° | | 0.8% protein 0.5% fat | |
| Sample #2 | after 2 hrs cook at 170° | | 0.7% protein 1.0% fat | |
| Sample #3 | after 3 hrs cook at 170° | | 1.0% protein 1.0% fat | |
| Sample #4 | after 3 hrs cook at ⅝° + 1 hr at 205° | | 1.3% protein 1.0% fat | |

The appearance of the cooked bone was drier in Test No. 3 than in Test No. 2 which is one of the functions of the use of a salt addition, that is, to provide drier bone. Also the salt addition in Test No. 3 increased the protein yield from 0.9% to 1.3% as compared with Test No. 2.

Test No. 4

The START and FINISH compositions of the materials cooked, including enzyme, are shown in the tables below as well as the cooking cycle details.

| START | 74# | crushed bones | 33.9% | |
|---|---|---|---|---|
| | 138# | water | 63.3% | |
| | 6# | enzyme | 2.8% | (Enzyme to water 4.3%) |
| | 218# | | 100.0% | |
| FINISH | 59# | bones | 20.3% | cook shrink |
| | 152# | solution | 10.1% | cook gain |
| | 211# | | 3.2% | cook loss (question scale accuracy) |
| Sample #1 | after 1 hr cook at 120° | | | 0.8% protein |
| Sample #2 | after 1 hr cook at 120° and 1 hr 135° | | | 1.5% protein |
| Sample #3 | after 1 hr cook at 120° and 2 hrs 135° | | | 2.1% protein |
| Sample #4 | after 1 hr cook at 120° 2 hrs 135° and 1 hr 150° | | | 2.2% protein |
| Sample #5 | finished cook with ½ hr at 170° | | | 3.1% protein |

The cooked bone was completely free of connective tissue and lean muscle and the bones had a very dry appearance. Test No. 4 illustrates that with a 2-1 ratio of water to bone along with enzyme as the starting mixture, cooked at relatively low temperatures for the first four hours and with a higher temperature during the last one-half hour produced more protein than in tests Nos. 2 and 3 and due to the higher finishing temperatures increased the protein extraction from 2.2% to 3.1%.

Test No. 5

The START and FINISH compositions of the treated materials are set forth in the tables below as well as the cooking program, which appears to show that the increase in the cooking temperature in early stages of the cycle had no effect on the protein extraction and that, in fact, the final amount of protein extracted in Test No. 5 (2.7%) was somewhat less than in Test No. 4 (3.1%).

| START | 66# | crushed bones | 33.4% |
|---|---|---|---|

-continued

|  | 126# | water | 63.8% |  |
|---|---|---|---|---|
|  | 5½ # | enzyme | 02.8% | (enzyme to |
|  | 197 ½ # |  |  | water 4.4%) |
| FINISH | 43# | bones | 23.0% |  |
|  | 144# | solution | 77.0% |  |
|  | 187# |  | 05.3% | cook loss |
| Sample #1 | after 1 hr cook at 135° |  |  | 0.8% protein |
| Sample #2 | after 2 hrs cook at 135° |  |  | 1.3% protein |
| Sample #3 | after 3 hrs cook at 135° |  |  | 1.8% protein |
| Sample #4 | after 3 hrs at 135° and ½ hr at 170° |  |  | 2.5% protein |
| Sample #5 | after 3 hrs at 135° and 1 hr at 170° |  |  | 2.7% protein |

The tissue and lean on the bones did not change in appearance too much throughout the 135° F. portion of the cooking cycle. Immediately after the 170° F. temperature in the cycle was started the tissue and lean commenced to separate and melt into the solution.

Test No. 6

The relative proportion of the materials being processed in this test as START and FINISH are shown in the table below as well as the amount of protein extracted at various stages of the heating cycle.

| START | 355# | crushed bones | 51.7% |  |
|---|---|---|---|---|
|  | 332# | water | 48.3% |  |
|  | 687# |  |  |  |
|  | 12# | papain enzyme | 1.75% | enzyme to total |
|  | 699# |  |  |  |
| FINISH | 217# | bones (cooked) | 31.0% | yield from green |
|  | 471# | solution | 67.4% | yield from green |
|  | 11# | cook loss | 1.6% | cook loss |
|  | 699# |  | 100.0% |  |
| 1st hour of cook |  |  | No Sample |  |
| 2nd hour of cook |  |  | 4.20% protein |  |
| 3rd hour of cook |  |  | 5.005% protein |  |
| 4th hour of cook |  |  | 5.258% protein |  |
| 5th hour of cook |  |  | 5.741% protein |  |

Another sample was taken from the clear solution only after it had settled and set for four days undisturbed in a tub truck the results being 6.439% protein.

The bone used in this test was taken directly from the boning table and had more muscle tissue than the bone used in the previous tests. Also the raw bone was ground to a somewhat smaller maximum dimension as compared with previous tests.

The heating cycle differed from that in previous tests, being generally Example A described above. The enzyme concentration in the starting solution is lower in Test No. 6 than in Test No. 5, but the ratio of bone to water is approximately equal by weight, thus differing substantially from the heating cycle of Test No. 5. Thus all temperatures in the stages of the heating cycle in Test No. 6 are higher than in Tests Nos. 4 and 5.

The enzymes used in Tests Nos. 4, 5 and 6 were Tona-300.

Many other tests have been carried out to determine the most favorable time/temperature controls of the heating cycle that should be followed to eliminate prior art difficulties and to avoid conditions where peptones, peptides and poly-peptides may be formed in the protein solution which, if formed, result in extremely bad odors and tastes.

These tests have resulted in the two slightly different heating cycles, Examples A and B above, that when coupled with a control of the percentage of enzyme added, overcome prior art difficulties that in the past have been corrected by subsequent acid hydrolysis treatment. In other words, the invention is characterized by the extremely critical combination of time/temperature heating cycle controls, Examples A and B, and the percentage of enzyme added.

Among a large number of tests conducted following Tests 1 through 6 set forth above, representative tests whose results have led to the discoveries of the invention are Tests Nos. 16, 18, 19 and 20, as follows:

Test No. 16

These tests were carried out by cooking crushed bones in water in percentages shown in the tables below labeled "in put." 90L indicates Papain 90 referred to above.

| In Put |  |
|---|---|
| 300.0# Crushed bones | 49.98% |
| 300.0# Water | 49.98% |
| 0.3# 90L - (00.10% of bone) | 00.05% |
| Out Put |  |
| 180# Cooked bones | 60% of Bone in put |
| 84# Grease | 28% of Bone in put |
| 307# Broth | 102% of Bone in put |
| Cooking Cycle |  |
| 55° to 135° | approx. :10 min. |
| 135° | 1 hour |
| 145° | 1 hour |
| 145° | 1 hour |
| 155° to 175° | approx. :05 min. |
| 175° | ½ hour |
| 175° to 200° | approx. :05 min. |
| 200° | ¼ hour |

Broth from this test contained 4.26% Protein, 6.58 pH.

Test No. 18

| In Put |  |
|---|---|
| 300.0# Crushed Bones | 52.1% of Total |
| 270.0# Water | 46.9% of Total |
| 0.3# 90L | 00.05% of Total |
| 6.0# NaCl (salt) | 01.04% of Total |
| 576.3# |  |
| Out Put |  |
| 156# Cooked bones | 52% of bone in put |
| 103# Grease | 34.3% of bone in put |
| 299# Broth | 99.7% of bone in put |

Broth from this test contained 05.36% Protein, 7.15 pH.

| Cooking Cycle |  |
|---|---|
| 55° to 135° | approx. :10 min. |
| 135° | 1 hour |
| 145° | 1 hour |
| 155° | 1 hour |
| 155° to 175° | approx. :10 min. |
| 175° | ½ hour |
| 175° to 200° | approx. :05 min. |

90L was added to water and bones before the cook cycle was started. The salt was added at the end of the 2nd hour of cook.

The bones were very dry and reasonably free of grease.

Test No. 19

| In Put | | |
|---|---|---|
| 300.0# | Crushed Bones | 52.1% of Total |
| 270.0# | Water | 46.9% of Total |
| 0.3# | 90L (00.10% of bones) | 00.05% of Total |
| 6.0# | NaCl (salt) | 01.04% of Total |
| 576.3# | | |
| Out Put | | |
| 132# | Cooked bones | 44.0% of bone in put |
| 88# | Grease | 29.3% of bone in put |
| 330# | Broth | 110.0% of bone in put |

Broth from this test contained 05.19% Protein, 7.06 pH.

| Cooking Cycle | |
|---|---|
| 55° to 135° | approx. :10 min. |
| 135° | 1 hour |
| 145° | 1 hour |
| 145° | 1 hour |
| 145° to 175° | approx. :05 min. |
| 175° | ½ hour |
| 175° to 200° | approx. :05 min. |
| 200° | ¼ hour |

90L was added to water and bones before the cook cycle was started. The salt was added at the end of the 2nd hour of cook. The bones were very dry and reasonably free of grease.

Test No. 20

| In Put | | |
|---|---|---|
| 300.0# | Crushed bones | 52.1% of Total |
| 270.0# | Water | 46.9% of Total |
| 0.3# | 90L 00.10% of bones | 00.05% of Total |
| 6.0# | NaCl (salt) | 01.04% of Total |
| 576.3# | | |
| Out put | | |
| 191# | Cooked bones | 63.7% of bone in put |
| 73# | Grease | 24.7% of bone in put |
| 293# | Broth | 97.7% of bone in put |

Broth from this test contained 06.46% Protein.

| Cooking Cycle | | pH |
|---|---|---|
| 55° to 135° | approx. :10 min. | — |
| 135° | 1 hour | 7.0 |
| 145° | 1 hour | 7.35 |
| 145° | 1 hour | — |
| 145° to 175° | approx. :05 min. | — |
| 175° | 1 hour | 7.05 |

90L was added to water and bones before the cook cycle was started. The salt was added at the end of the 2nd hour of cook. The bones were good and dry but not as free of grease as Test Nos. 18 and 19.

In developing the new, simple and inexpensive protein extraction procedure of the invention, and in analyzing difficulties presented by prior art procedures, we have found that the protein in beef bones being extracted must be placed in solution without denaturing any more than necessary. Temperatures in excess of 195° F. must be avoided to avoid the presence of undesirable characteristics or properties in the cooked solution which result when higher temperatures are used. In denaturing there is some point in reactions which progress, when water molecules are split off and amino acids may go into solution. This in itself is not undesirable but if reactions proceed to the point where the whole chain goes into solution, the amino acids are broken down and peptides are formed which have a bitter taste. This bitterness, in turn, requires a subsequent acid treatment to reduce the pH and eliminate the bitter taste.

Chemically, proteins are very different from fats. However, we have discovered that simultaneous treatment or rendering of the proteins and fats contained in the beef bones, during a controlled heating cycle provides extraction from the bone of both fats and protein which go into solution. The solution then may be treated to readily separate the fats and protein.

In so treating the material, the reaction must be stopped because if the material is heated too long or at too high a temperature, as indicated above, peptides or peptones will be produced. Such undesirable results are eliminated by the procedures which characterize the discoveries of the invention.

At the same time, by avoiding temperatures in excess of 195° F. in cooking the beef bones with enzymes, thermal shock to the components also is avoided.

We have discovered that the enzyme action in the solution being cooked may be effectively controlled or stopped without heating to 212° F. This is accomplished under the concepts of the invention by limiting the heating temperature to be not in excess of 195° F., and by continuing the heating at that temperature for a sufficient time so that enzyme reactions are stopped.

We have also discovered as a result of the further experiments referred to, that heating the bone-water-enzyme solution for too long a time in the 150° F. to 160° F. stage also creates undesirable peptones, peptides, and poly-peptides.

Thus, we have found that by holding the Papain 90L at 1/10th of 1% by weight of the bone in the solution being heated, and by controlling the heating cycle below 150° F. for approximately 3-3½ hours, and by adding salt (NaCl) at the end of the second hour of heating in the amount of 2% by weight of the ingoing bone, good solubility of the protein (4½% to 6½%) is obtained, clean, dry bones result and no bad odors or flavors occur.

Finally, the heating cycle temperature is driven rapidly through the 150° F.-160° F. range up to 195° F. to inactivate the enzyme and prevent further action on the protein. This 195° F. temperature may be held for 45 minutes to be sure that all enzyme is inactive.

The ideal temperature for maximum action of Papain 90L is apparently 158° F. However, rather than heating the bone-water-enzyme solution at this 158° F. temperature, such heating should be avoided for the reasons indicated in the discussion immediately above so as to avoid creation of undesirable peptones, etc. Thus the temperature during the 3-3½ hour heating cycle is controlled below 150° F. and then is driven rapidly past the 158° F. temperature to the 195° F. temperature for inactivating the enzyme.

As indicated above, the function of the salt addition (NaCl) is to increase the amount of protein dissolved in the aqueous solution and to produce drier bone. Tests indicate that cooking bone in water extracts about 1-1.5% protein. Cooking bone in water with salt may increase the protein extraction to 2-2.5%. A similar increase in protein extraction apparently occurs when bone, water, Papain 90L solution is cooked with a salt addition to dissolve the protein and produce an end product of 4–7% aqueous protein solution.

As indicated, one of the aspects of the invention is to prevent the formation of undesirable peptones, peptides and poly-peptides at all times during processing. The reason for making the pH determinations noted in several of the tests is to determine whether peptones, etc. may be present, since pH values appreciably above 7.00 tend to indicate the presence of peptones, etc. No appreciable peptone content has been found to occur where the pH values range from 6.58 to 7.15, which are the pH value range in Tests Nos. 16, 18, 19 and 20.

The fundamental procedures of the invention essentially comprise a rendering process involving separation from the bone and placing in aqueous solution the fats and protein contained in the bone. This rendering is completed during the heating cycle. The control of the heating cycle and the interrelationship of the reactions which occur between the solution components and their relative amounts during the time/temperature control of the heating cycle tend to increase solubility of the protein.

In the final formation of the aqueous solution of protein by centrifuging, the aqueous protein solution is purified somewhat in separating the fats from the solution.

Accordingly, the concepts of various aspects and discoveries of the invention described, provide new procedures which solve problems that have existed in the art, obtain new results, achieve the stated objectives, and eliminate difficulties arising with prior procedures.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover the description of the invention is by way of example and the scope of the invention is not limited to the exact details set forth in the examples.

Having now described the features, discoveries and principles of the invention, the manner in which beef bones are treated, the advantageous, new and useful results obtained, the new and useful procedures, treatments, steps and operations are set forth in the appended claims.

We claim:

1. The method of making edible gelatin bone, tallow and aqueous protein broth products from edible beef bones which consists in crushing edible beef bones to form bone fragments having a maximum dimension of up to $\frac{5}{8}''$; forming an aqueous mixture of approximately equal amounts by weight of said bone fragments and water; adding to the aqueous mixture papain based proteolytic enzymes of the class consisting of Tona-300 and Papain 90L enzymes in the amount by weight of the bone fragments of about $3\frac{1}{2}$% Tona-300 enzymes or 1/10th of 1% Papain 90L enzymes; heating and agitating the aqueous bone-enzyme mixture during a heating cycle at about at least 125° F. but not exceeding about 155° F. for approximately 3–3½ hours, and then at step-up temperatures of up to, but not exceeding, 195° F. for a total heating cycle time not exceeding 6 hours; maintaining a final 195° F. heating temperature for a time duration at the end of said heating cycle sufficient to inactivate the enzymes; said heating cycle treatment simultaneously separating the tallow from the bone fragments, and hydrolyzing and solubilizing protein in the bone fragments; filtering and screening the solids from the liquid in the heated mixture while maintaining the mixture at a temperature of between 135° F. and 190° F. to produce separated edible gelatin bone products having a maximum dimension not greater than $\frac{5}{8}''$, and a minimum dimension not less than 3/16" and a separated liquid; centrifuging the separated liquid while maintaining the temperature thereof between 135° F. and 190° F., to obtain edible tallow products, and an edible aqueous 4% to 7% by weight protein broth.

2. The method set forth in claim 1 in which the heating cycle includes heating to increase the temperature of the aqueous bone-enzyme mixture from 55° F. to 135° F. in about 20 minutes; continuing the heating while maintaining the 135° F. temperature for about one hour; increasing the heating temperature to and heating at 145° F. for one hour; increasing the heating temperature to and heating at 155° F. for one hour; increasing the heating temperature to about 175° F. in ½ hour; and finally raising the heating temperature to and heating at 195° F. for 45 minutes.

3. The method set forth in claim 2 in which the enzyme added is Papain 90L, and in which NaCl is added to the solution at the end of the second hour of heating in the amount of 2% by weight of the bone fragments.

4. The method set forth in claim 1 in which the heating cycle includes heating to increase the temperature of the aqueous bone-enzyme mixture from 55° F. to 125° F. in 10 to 15 minutes; maintaining the heating temperature at 125° F. for one hour; increasing the heating temperature to and heating at 135° F. for one hour; increasing the heating temperature to and heating at 145° F. for one hour; increasing the heating temperature to 195° F. in approximately 5–10 minutes; and finally heating at a temperature of 195° F. for 45 minutes.

5. The method set forth in claim 4 in which the enzyme added is Papain 90L and in which NaCl is added to the solution at the end of the second hour of heating in the amount of 2% by weight of the bone fragments.

6. The method set forth in claim 1 in which the temperature is raised rapidly at the end of the 3–3½ hours of heating to 195° F. to inactivate the enzyme.

7. The method set forth in claim 6 in which the final heating at 195° F. is maintained for 45 minutes to insure inactivation of the enzyme.

8. The edible aqueous 4–7% solution of protein by weight product in which the protein is placed in solution from beef bones free of the formation of peptones, peptides or poly-peptides during processing by the method set forth in claim 7.

* * * * *